Patented Dec. 27, 1949

2,492,802

UNITED STATES PATENT OFFICE 2,492,802

PROCESS FOR MAKING ANTHRAQUINONE-ACRIDONES

Hans Z. Lecher, Plainfield, and Warren S. Forster, Somerville, N. J., assignors to American Cyanamid Company, New York, N. Y., a corporation of Maine No Drawing. Application May 14, 1945, Serial No. 593,762

6 Claims. (Cl. 260—276)

1

This invention relates to a process for preparing anthraquinone acridones from ortho carboxy substituted arylamino anthraquinones.

An anthraquinone acridone may be considered as a polynuclear heterocycle having at least five rings, in which there is present the following group:

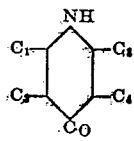

wherein the pair of carbon atoms $C_1C_2$ belongs to an anthraquinone nucleus and the pair of carbon atoms $C_3C_4$ belongs to any aromatic ring system. The anthraquinone acridone may be unsubstituted or one or other of the rings may carry substituents such as alkyl, aryl, halogen, nitro, etc., which groups are not affected by the reagent used in the ring closure. Some of the anthraquinone acridones have only one anthraquinone acridone ring and others may have two or more.

Anthraquinone acridones have been prepared from orthocarboxy substituted arylamino anthraquinones in which the carboxy group may be attached to the anthraquinone nucleus or to the other aromatic ring. These compounds may be considered to have one or other of the following essential groups:

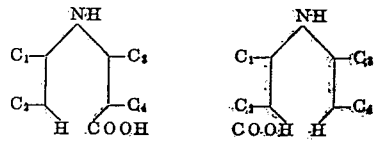

in which the carbon atoms $C_1$ to $C_4$ have the same significance as in the group referred to above.

In the past the anthraquinone acridones have been prepared by ring closure using various known ring closing reagents, such as sulfuric acid, sulfuryl chloride, chlorosulfonic acid, acetic anhydride, benzoyl chloride; also thionyl chloride alone and phosphorus oxychloride alone have been used. While it has been possible to produce the anthraquinone acridones by the ring closure procedures of the prior art these processes have presented serious disadvantages which have limited their general applicability. In general there are four principal types of disadvantages, one or more of which have been encountered in individual cases. They are as follows:

1. In the first place, when phosphorus oxychloride is used, the acridone is contaminated with amorphous, sticky decomposition products of phosphorus oxychloride which makes it difficult to handle, particularly in filtration, thus making further processing expensive.

2. Low yield, which is tantamount to high cost, because the carboxy arylamino anthraquinones used as reagents are expensive chemicals.

3. Unsatisfactory purity, which is a serious factor in many cases as the acridones are principally used as dyestuffs or intermediates for dyestuffs. Impurities often have a serious effect on shade or dyeing properties and often this effect is to be noted even when the amount of impurities is small.

4. Side reactions, for example, decarboxylation instead of dehydration with ring closure, sulfonation when sulfuric acid is used, etc.

The present invention is based on a two step process in which the first step is to heat the carboxy arylamino anthraquinones with thionyl chloride to moderately elevated temperatures, for example, of the order of magnitude of about 100° C., which converts the carboxy arylamino anthraquinone into its acid chloride without material ring closure. Then the acid chloride, preferably, though not necessarily, without isolation, is heated with small amounts of phosphorous oxychloride, usually in catalytic amounts, the temperature being somewhat higher and being maintained at a sufficiently high point to produce ring closure.

The amount of thionyl chloride to be used in the first step should be at least stoichiometrical, best results being obtained with a slight excess, for example, 10 to 15%. The exact amount of thionyl chloride is not critical. It is preferred to carry out the first step of the present process in a solvent, preferably an organic liquid, which is substantially inert to the action of thionyl chloride and phosphorus oxychloride. A wide choice of solvents are available, but it is preferred to use one in which the anthraquinone acridone to be produced is appreciably soluble at the boiling point of the solvent, and substantially insoluble or of very low solubility at lower temperatures. Typical cheap and satisfactory solvents are nitrobenzene, dichlorbenzene and trichlorbenzene. These solvents possess the requisite inertness to thionyl chloride and phosphorus oxychloride and the right solubility for the anthraquinone acridones at boiling and lower temperatures. They also have boiling points which are suitable for the last step of ring closure, which can therefore be effected under reflux, providing an automatic temperature control. The process is not limited in any way to these three solvents and other inert liquids may be used, provided they have a reasonably elevated boiling point. Where the boiling point is above the temperature at which it is desired to ring close, the additional advantage of automatic temperature control by operation under a reflux is not enjoyed, and with such liquids the process while efficient, requires somewhat more careful supervision as it lacks the automatic temperature control.

High purity of either the thionyl chloride or the phosphorus oxychloride is not necessary. The ordinary commercial grades of these reagents give excellent results and permit using a cheaper product which is readily available. The relative insensitiveness of the process to the purity of the reagents constitutes a practical operating advantage.

The amount of phosphorus oxychloride is not critical. Of course it must be present in sufficient amounts to exert its catalytic ring closing effect. In general the lower limit is about 0.05 mols of phosphorus oxychloride. The lower limit of phosphorus oxychloride set out above represents a practical limit. There is no sudden break, but below this amount of phosphorus oxychloride the yields crop off and the process becomes uneconomical. For best results it is desirable to operate somewhat above the minimum and larger amounts of phosphorus oxychloride do not adversely affect the efficiency of the ring closing step. However, no advantages in speed of reaction or increase in yield are obtained by exceeding .25 mols of phosphorus oxychloride. Larger amounts are without benefit and merely represent a waste of the oxychloride.

It is a further advantage of the present invention that the orthocarboxy arylamino anthraquinone does not have to be of extraordinary purity. These compounds are often contaminated with some of their alkali metal salts. Any large portion of alkali metal salts adversely affects the efficiency of the process. However, small amounts up to a maximum of 10% do not interfere appreciably with the yield. It is therefore unnecessary to employ an elaborate purification process in obtaining the orthocarboxy arylamino anthraquinone to be used in the process. This reduces the cost of the raw material and represents a further economical advantage.

As has been stated above the temperature in the first step is of the order of magnitude of about 100° C. Best results are obtained slightly under this temperature, the preferred range being from 80 to 95° C. The temperature is not critical and extremely elaborate temperature controls with their accompanying high cost are not necessary. Of course the temperature should not be allowed to vary within wide limits, and the ordinary good chemical practice of maintaining reasonable temperature control should be followed.

It is unnecessary to isolate the acid chloride of the orthocarboxy arylamino anthraquinone produced by the first step of the present process. In fact, it is preferable not to isolate it because the same inert solvent in which the first step is preferably carried out forms a very satisfactory reaction medium for the second step. The fact that it is not necessary to isolate the product of the first step of the process is an important operating advantage as it is unnecessary to remove the reaction medium from the vessel in which the first step was carried out. The second or ring closure step is effected by raising the temperature and adding the catalytic amounts of phosphorus oxychloride. The temperatures for the second step are well above the temperatures used in the first step but are in no sense critical. Ring closure begins somewhat below 150° C. and is quite satisfactory at 150° C., which is high enough to effect the ring closure and to remove hydrogen chloride and excess thionyl chloride. Higher temperatures may be used; thus, for example, refluxing at 210° C., the boiling point of nitrobenzene does not introduce any deleterious effect. In fact, this refluxing at a higher temperature presents advantages with a number of the acridones in that it produces a more readily filterable product on slow cooling. The fact that the temperature of the second step is in no sense critical permits adjustment to meet the desired working conditions and the wide range of choice makes the process both simple and flexible.

The acridone produced is usually in a crystalline form. Normally it filters readily and foreign matter may be removed by washing with additional small quantities of cold solvent. The high efficiency of the present process, which with many acridones results in yields in excess of 90%, produces a reaction mixture which is not contaminated with large amounts of impurities. In case the acridone is to be subjected to further chemical processing, for example, if it is desired to chlorinate the product, the further processing may be effected in the reaction mixture without isolation of the acridone. This represents a saving in time, handling, and solvent loss, and represents a great practical advantage.

It is not intended to restrict the present invention to any theory of action. It seems probable, though, that the following explanation may constitute at least one factor. Thionyl chloride is efficient in producing acid chlorides, but not very efficient in ring closure. Phosphorus oxychloride ring closes primarily by dehydration and then forms sticky viscous decomposition products. In the present process the first step converts the carboxylic group into the acid chloride and ring closure in the second step is then accompanied by elimination of hydrogen chloride rather than water. Phosphorus oxychloride appears to be even more efficient in eliminating hydrogen chloride than in eliminating water, which is rather surprising, as it is normally considered as acting primarily as a dehydrating agent and not as a Friedel-Crafts catalyst. Unquestionably the phosphorus oxychloride does not act as a straight dehydrator or even a hydrogen chloride acceptor. The small amounts which give excellent results are far too little to act as a reagent in combining with hydrogen chloride, and therefore it seems probable that phosphorus oxychloride is able to remove hydrogen chloride and effect ring closure by a catalytic action which is entirely different from its usual dehydrating action which requires stoichiometrical quantities.

The process of the present invention should not be confused with a process in which a mixture of phosphorus oxychloride and thionyl chloride are used. Such a mixture will not behave in the same manner as the two step process of the present invention in which each of the two reagents is used alone in a separate step. When a mixture is used the same difficulties are encountered with the formation of viscous sticky decomposition products of phosphorus oxychloride.

The improved two step process of the present invention is applicable to the production of large number of anthraquinone acridones. One of the important groups includes the anthraquinone- 2,1-benzacridone, the parent member of which has the following formula:

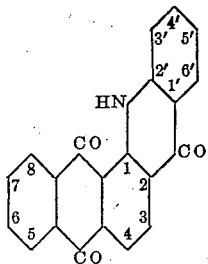

Various substituents may be present on one or both rings, typical derivatives being the following: 4-methyl-, 5'-methyl-, 4',6'-dimethyl-, 5'-phenyl-, 5'-fluoro-, 4'- or 6'-trifluoromethyl-, 4-, 3'-, 4'-, 5'-, or 6'-chloro-, 5,8-, 3',4'-, 3',6'-, 4',5'-, 4',6'-, 5',6'-dichloro-, 3,4',6'-, 4,3',5'-, 4,4',6'-, 3',4',5'-, 3',4',6'-, 3',5',6'-, 4',5',6'-trichloro-, 3,3',5',6'-, 3,4',5',6'-, 4,3',4',5'-, 4,3',5',6'-, 4,4',5',6'-, 3',4',5',6'-tetrachloro-, 3,3',4',5',6'-, 4,3',4',5',6'-pentachloro, 3 - bromo-, 5'-bromo-3',5'-dibromo-, 6'-nitro-, 4-, 5-, 8- or 5'-amino-, 4-hydroxy-, 4' or 5'-methoxy-, 3'-phenoxy-, 3'-methyl-6'-chloro-, 3,3',5'-trichloro-4-amino-, 4'-trifluoromethyl-4-amino, 3-chloro-4-amino-, 6'-chloro-4-amino-, 3,3',5'-trichloro-4-amino-, 6'-chloro - 3' - methoxy-, 6' - chloro-3'-ethoxy-, 3'-chloro-3'-phenoxy-, 4',6'-dichloro - 3' - phenoxy-anthraquinone-2,1(N)-benzacridone.

The isomeric anthraquinone-2,3-benzacridone is another type of ring which may be prepared by the present invention. Similarly anthraquinone dibenzacridones, anthraquinone naphthacridones, anthraquinone - dinaphthacridones, anthraquinone dibenzacridone - naphthacridone, anthrimide acridones (diphthaloyl acridones) and the like are also included.

The $C_3$ and $C_4$ carbon atoms of the chain type formula may also belong to another type of nucleus, for example, anthrathrone, anthracene, benzanthrone, meso - benzidanthrone, dibenzo-pyrene-quinone, naphthacene-quinone and pyrene. As in the case of anthraquinone-2,1-benzacridone these other compounds may have substituents, such as alkyl, aryl, halogen, nitro, amino, alkylamino, arylamino, acylamino, hydroxy, alkoxy and aryloxy.

The following are a few formulas of typical unsubstituted anthraquinone acridones which can be prepared by the process of the present invention.

Anthraquinone-benzacridones (phthaloyl acridones)

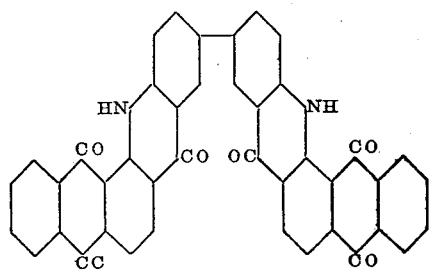

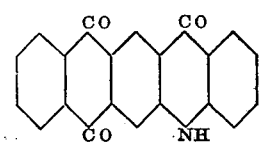

Anthraquinone-dibenzacridones

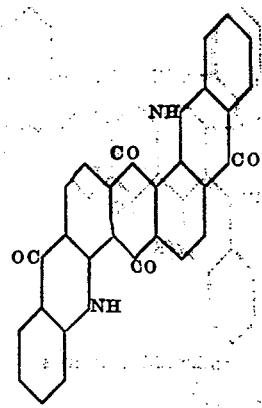

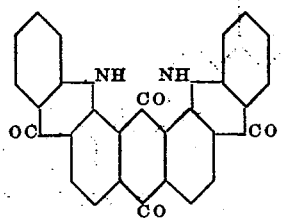

Anthraquinone-naphthacridones

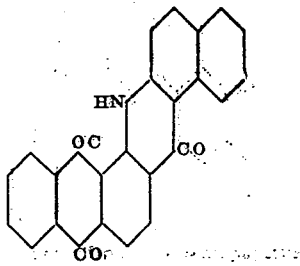

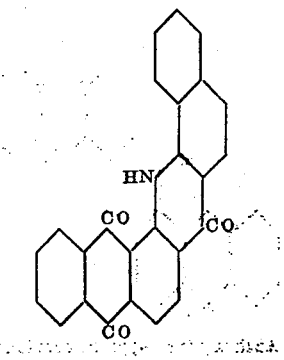

Anthraquinone-dinaphthacridone

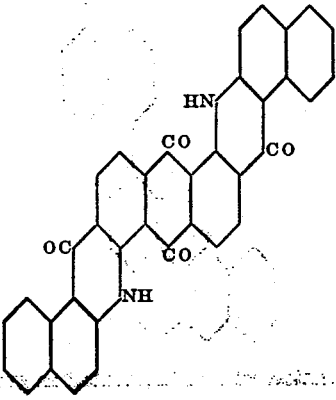

Anthraquinone-dibensacridone-naphthacridone

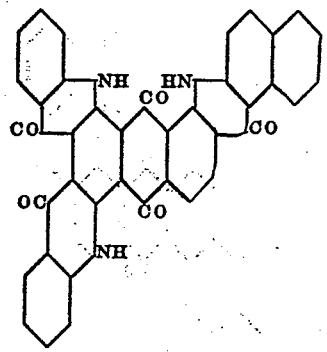

Anthrimide-acridones

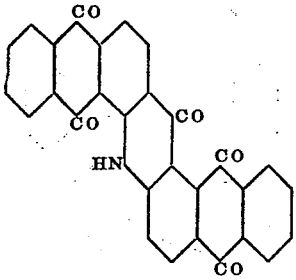

(Diphthaloyl acridones)

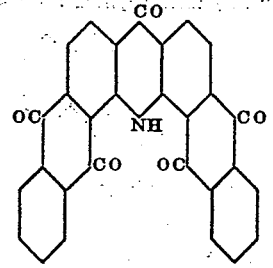

Anthraquinone-benzanthrone-acridone

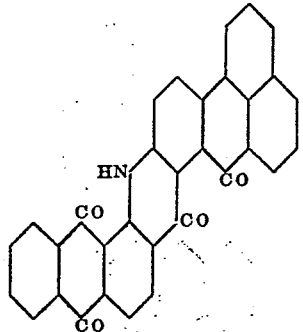

Anthraquinone-pyrene-acridone

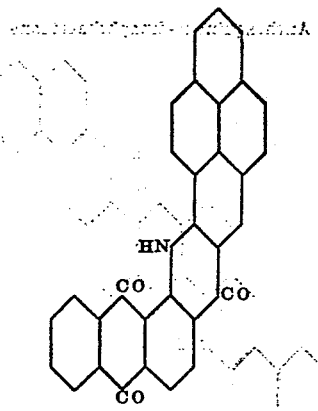

The invention will be illustrated in greater detail in conjunction with the following specific examples which are typical. The parts are by weight.

*Example 1*

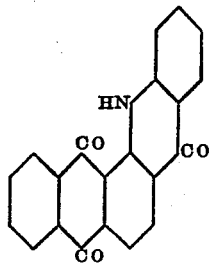

25 parts of 1-(o-carboxyanilino) anthraquinone are slurried in approximately 90 parts of nitrobenzene. 9.8 parts of thionyl chloride are slowly added while stirring and heating at 80°–90° C. This temperature is maintained for approximately three hours. Then 1.7 parts of phosphorus oxychloride are added, together with additional amounts of nitrobenzene to the now thickened slurry. The mixture is slowly brought to reflux with the evolution of much hydrogen chloride accompanying the rise in temperature. The acridone is obtained by allowing the solution to cool and crystallize, filtering, washing with cold nitrobenzene and finally steam stripping. The yield of anthraquinone-2,1 (N)-benzacridone is about 95% of theory.

The yield of 95% obtained above may be compared with the yields which are obtainable with thionyl chloride or phosphorus oxychloride when used alone. Thus, when the same amount of thionyl chloride is used under the same temperature conditions the yield is only 71%. Similarly, when phosphorus oxychloride is used in stoichiometrical amounts and the mixture heated first at 190–200° C. and then for some hours at 150–160° C. the yield is 70%. This represents about the maximum yields obtainable when either reagent is used alone in a single step process. In the case of the product obtained with phosphorus oxychloride alone the reaction mass is very sticky and filters with great difficulty and this represents a much less satisfactory physical form, in addition to the decreased yield.

*Example 2*

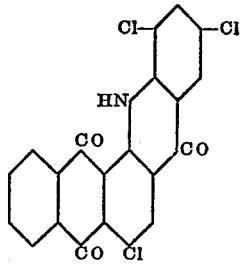

The reaction mixture from Example 1, without isolating the acridone, is subjected to chlorination by heating at about 80°–90° C. for 2–3 hours with 1.6 parts of iodine and 22 parts of sulfuryl chloride, together with sufficient nitrobenzene to enable thorough stirring. The temperature is then slowly increased to 145° to 150° C. and that temperature maintained for approximately one hour longer. The mixture is allowed to cool slowly without stirring and the resulting red crystalline mass filtered, washed with nitrobenzene, and the solvent removed. A chlorinated anthraquinone-2,1 (N)-benzacridone having superior dyeing properties is obtained in excellent yields.

Example 3

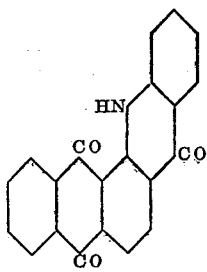

98 parts of orthodichlorobenzene and 25 parts of 1-(o-carboxyanilino) anthraquinone are mixed with stirring and 9.8 parts of thionyl chloride are slowly added. The mixture is heated to 80°–90° C. and held at that temperature with stirring for approximately three hours. Then 1.7 parts of phosphorus oxychloride are added, together with additional amounts of ortho-dichlorobenzene to the now thickened slurry. The mixture is slowly brought to reflux; a strong evolution of hydrogen chloride takes place. The product is obtained by allowing the solution to crystallize out on slow cooling, filtering, washing with cold orthodichlorobenzene, and finally steaming. The yield of anthraquinone-2,1 (N)-benzacridone is excellent.

Example 4

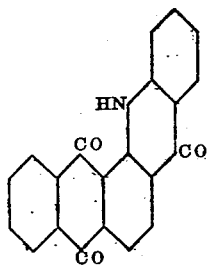

15 parts of 1-anilino-2-carboxy-anthraquinone are mixed in 90 parts of nitrobenzene and 5.9 parts of thionyl chloride are slowly added. The mixture is then heated and stirred at 80°–90° C. for approximately three hours. 0.8 part of phosphorus oxychloride is then added and the mixture is slowly heated to reflux accompanied by the evolution of hydrogen chloride. The dark red solution is allowed to cool and to crystallize, and the crystals are separated from nitrobenzene by filtration and steam stripping. An excellent yield of anthraquinone-2,1 (N)-benzacridone is obtained.

Example 5

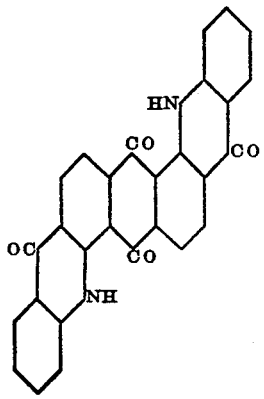

60 parts of 1,5-di(carboxyanilino) anthraquinone are slurried in 480 parts of nitrobenzene. To the slurry held at 75° to 80° C. are added slowly 35 parts of thionyl chloride and the stirring and heating are continued for two hours at 75° to 80°. 7 parts of phosphorus oxychloride are then added and the mixture is stirred at 145° to 150° C. for 1 to 2 hours and then at reflux temperatures for approximately ½ hour longer. When cool, the crystalline mass is filtered, washed with nitrobenzene, and freed from the solvent by steam stripping. The anthraquinone-2,1 (N)-6,5 (N)-dibenzacridone is obtained in a very pure state and in excellent yields.

Example 6

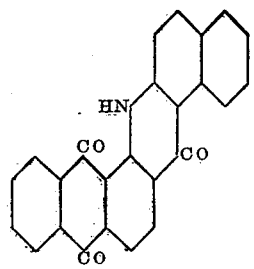

25 parts of 1-(β-naphthylamino)-2-carboxyanthraquinone are slurried in 120 parts of nitrobenzene to which 9.8 parts of thionyl chloride are added. The mixture is heated and stirred for 2 to 3 hours at 85° to 95° C. 1.7 parts of phosphorus oxychloride and 60 parts of nitrobenzene are then added and the slurry is slowly heated to the reflux temperature and held at reflux for approximately ½ hour. After cooling the crystalline mass is filtered, washed with nitrobenzene and freed from solvent by steam stripping. The yield of anthraquinone-2,1 (N), 1',2' (N)-naphthacridone is obtained in excellent yields.

Example 7

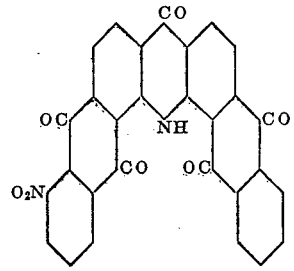

9.5 parts of 5-nitro-1,1'-dianthraquinonylamine-2'-carboxylic acid, 120 parts of nitrobenzene and 5.5 parts of thionyl chloride are stirred, heated up to a temperature of about 175°–180° C. and kept there until acid chloride formation is complete. 0.65 part of phosphorus oxychloride is then added and the mass is stirred further at 180°–190° for 2 hours. After cooling to 100°, the nitrobenzene is steamed out, and the insoluble reaction product digested for an hour with a mixture of 100 parts water, 100 parts alcohol and 2 parts caustic soda. The product is then filtered and washed free of alkali. The reddish brown dyestuff having the above structure is obtained in good yields. It gives a brown-violet vat and dissolves in conc. sulfuric acid with an orange color.

Example 8

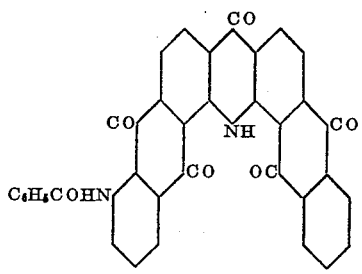

10.4 parts of 5-benzoylamino-1,1'-dianthraquinonylamine-2'-carboxylic acid are introduced into 120 parts of nitrobenzene, 3.0 parts of thionyl chloride are added, and the mass is stirred at about 110°–120° for 3 hours, and then for an additional hour at 140°–145°. After cooling to about 100°, 0.65 part of phosphorus oxychloride and 30 parts of nitrobenzene are added and the mixture is heated again to 150° and held at that temperature with stirring for 3 hours. After cooling to room temperature, the product is filtered, washed with nitrobenzene and alcohol, and slurried in a mixture of 150 parts water, 100 parts alcohol and 2 parts sodium hydroxide at the boiling temperature for 1 hour. It is then filtered, washed with water and dried. If desirable, the product may be after treated with benzoyl chloride. The yield is excellent. It dissolves in concentrated sulfuric acid with an orange color and dyes cotton red shades from a brown-violet vat.

We claim:

1. A process for producing an anthraquinone acridone from a compound containing at least one structural unit of the following formula:

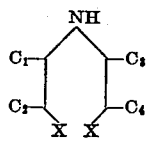

wherein the pair of carbon atoms $C_1$ and $C_2$ belong to an anthraquinone nucleus and the pair of carbon atoms $C_3$ and $C_4$ belong to any aromatic nucleus, and wherein one X stands for COOH and the other X stands for H, which comprises converting said compound into its acid chloride by heating in an inert organic solvent with at least one mol of thionyl chloride per molecular equivalent of carboxylic acid group, and then heating the resulting acid chloride at a higher temperature with phosphorus oxychloride in amounts of at least 0.05 mol of phosphorus oxychloride per molecular equivalent of carboxylic acid group.

2. A process according to claim 1 in which the carbon atoms $C_3C_4$ are part of an unfused benzene ring.

3. A process according to claim 1 in which the carbon atoms $C_3C_4$ are part of a naphthalene ring.

4. A method of producing anthraquinone-2,1-benzacridone from 1-(o-carboxylanilino)-anthraquinone which comprises converting the latter compound into its acid chloride by heating it in an inert organic solvent with at least one mol of thionyl chloride per molecular equivalent of carboxylic acid group, and then heating the resulting acid chloride at a higher temperature with phosphorus oxychloride in an amount of at least 0.05 mol per mol of carboxyanilino anthraquinone.

5. A method of producing anthraquinone-2,1 (N) - 6,5 (N) - dibenzacridone from 1,5 - di(carboxylanilino)-anthraquinone which comprises converting the latter compound into its acid chloride by heating it in an inert organic solvent with at least one mol of thionyl chloride per molecular equivalent of carboxylic acid group, and then heating the resulting acid chloride at a higher temperature with phosphorus oxychloride in an amount of at least 0.1 mol per mol of carboxyanilino anthraquinone.

6. A method of producing anthraquinone-2,1 (N), 1',2' (N)-naphthacridone from 1-(β-naphthylamino)-2-carboxyanthraquinone which comprises converting the latter compound into its acid chloride by heating it in an inert organic solvent with at least one mol of thionyl chloride per molecular equivalent of carboxylic acid group, and then heating the resulting acid chloride at higher temperature with phosphorus oxychloride in an amount of at least 0.05 mol per mol of carboxy naphthylamino anthraquinone.

HANS Z. LECHER.
WARREN S. FORSTER.

REFERENCES CITED

The following references are of record in the file of this patent:

UNITED STATES PATENTS

| Number | Name | Date |
|---|---|---|
| 961,048 | Ullmann | June 7, 1910 |
| 2,042,165 | Wuertz | May 26, 1936 |
| 2,374,891 | Peter | May 1, 1945 |